United States Patent
Wolff et al.

(10) Patent No.: US 10,935,720 B2
(45) Date of Patent: Mar. 2, 2021

(54) LASER BEAM PRODUCT PARAMETER ADJUSTMENTS

(71) Applicant: II-VI Delaware, Inc., Wilmington, DE (US)

(72) Inventors: Detlev Wolff, Kleinmachnow (DE); Andrea Heuser, Teltow (DE)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 16/397,340

(22) Filed: Apr. 29, 2019

(65) Prior Publication Data

US 2020/0341189 A1    Oct. 29, 2020

(51) Int. Cl.
| | |
|---|---|
| G02B 6/028 | (2006.01) |
| G02B 6/02 | (2006.01) |
| G02B 27/30 | (2006.01) |
| G02B 6/26 | (2006.01) |

(52) U.S. Cl.
CPC ....... G02B 6/0288 (2013.01); G02B 6/02076 (2013.01); G02B 6/262 (2013.01); G02B 27/30 (2013.01); G02B 6/02085 (2013.01)

(58) Field of Classification Search
CPC  G02B 6/4401; G02B 6/4415; G02B 6/02076; G02B 6/0288; G02B 27/30
See application file for complete search history.

(56) References Cited

U.S. PATENT DOCUMENTS

| | | | |
|---|---|---|---|
| 5,887,096 A | 3/1999 | Du et al. | |
| 6,487,338 B2 * | 11/2002 | Asawa | G02B 6/262 |
| | | | 385/124 |
| 6,630,658 B1 * | 10/2003 | Bohnert | G01L 11/025 |
| | | | 250/227.14 |
| 6,839,483 B2 * | 1/2005 | Reed | A61B 5/0084 |
| | | | 385/28 |
| 7,248,762 B2 * | 7/2007 | Hallemeier | G02B 6/14 |
| | | | 385/28 |
| 9,066,736 B2 | 6/2015 | Islam | |
| 9,250,390 B2 * | 2/2016 | Muendel | B23K 26/0648 |
| 9,444,226 B2 | 9/2016 | Krause et al. | |
| 10,295,845 B2 * | 5/2019 | Kliner | G02F 1/0115 |

(Continued)

FOREIGN PATENT DOCUMENTS

| | | | | |
|---|---|---|---|---|
| CN | 202815262 U | * | 3/2013 | .............. G02B 6/28 |
| EP | 2508934 A3 | | 12/2012 | |

OTHER PUBLICATIONS

"Fiber Laser" https://en.wikipedia.org/wiki/Fiber_laser, Fiber laser—Wikipedia, Jun. 2018.

(Continued)

*Primary Examiner* — Daniel Petkovsek
(74) *Attorney, Agent, or Firm* — Blank Rome LLP

(57) ABSTRACT

Systems, apparatuses, and methods are described for modifying a beam parameter product of a laser beam. The modified beam parameter product may increase the number of tasks that may be performed using a given laser with its original beam parameter product. By increasing the beam parameter product of a laser, an initial low beam parameter product beam may be used to perform tasks requiring a higher beam parameter product. The beam may be modified to redirect portions of the beam at different angles via one or more non-imaging refracting optical components or by one or more Fiber Bragg gratings.

20 Claims, 10 Drawing Sheets

(56) References Cited

U.S. PATENT DOCUMENTS

| | | | |
|---|---|---|---|
| 10,520,671 B2* | 12/2019 | Farrow | G02B 6/03611 |
| 2003/0156786 A1* | 8/2003 | Pan | G02B 6/29368 |
| | | | 385/27 |
| 2005/0201701 A1* | 9/2005 | Chanclou | G02B 6/0288 |
| | | | 385/124 |
| 2012/0074110 A1 | 3/2012 | Zediker et al. | |
| 2018/0059344 A1 | 3/2018 | Watanabe et al. | |
| 2018/0095199 A1 | 4/2018 | Li et al. | |
| 2018/0138659 A1 | 5/2018 | Kobayashi et al. | |
| 2019/0339454 A1* | 11/2019 | Landry | G02B 6/268 |

OTHER PUBLICATIONS

Treusch et al., "Fiber-coupling technique for high-power diode laser arrays", SPIE vol. 3267 • 8277-786X198, pp. 98-106, 1998.
Siegman "Defining, measuring, and optimizing laser beam quality", Proc. SPIE 1868, Laser Resonators and Coherent Optics: Modeling, Technology, and Applications, (Aug. 13, 1993); pp. 1-12.

* cited by examiner

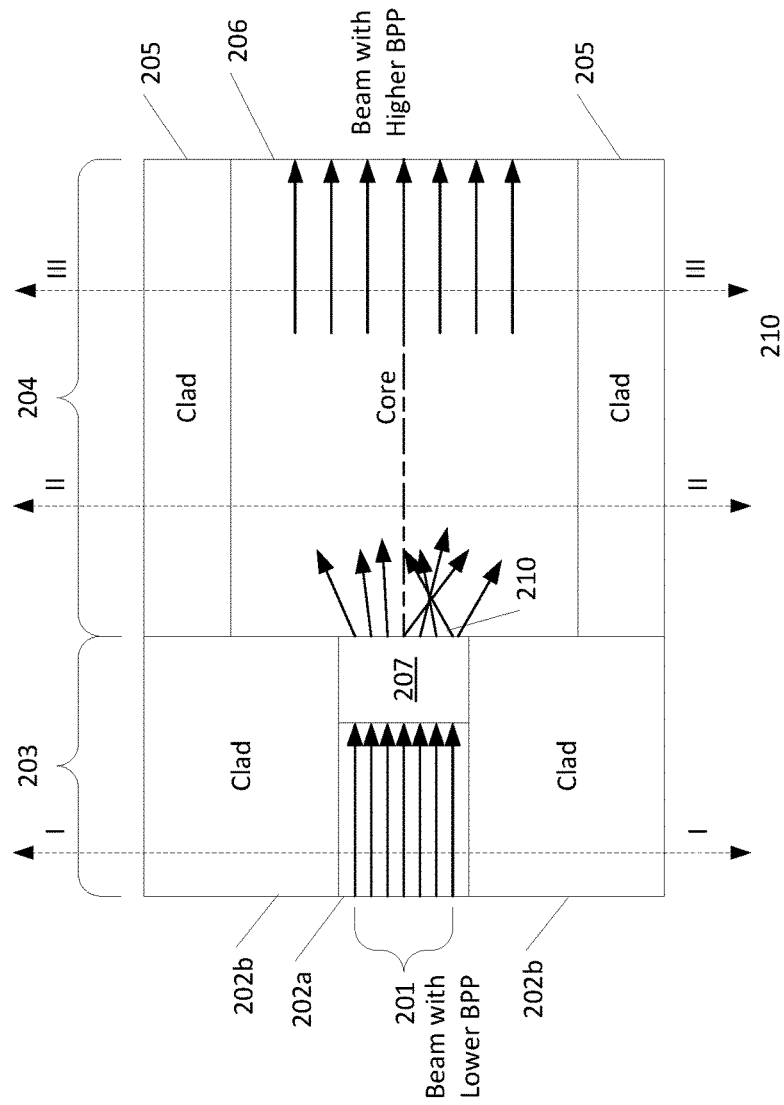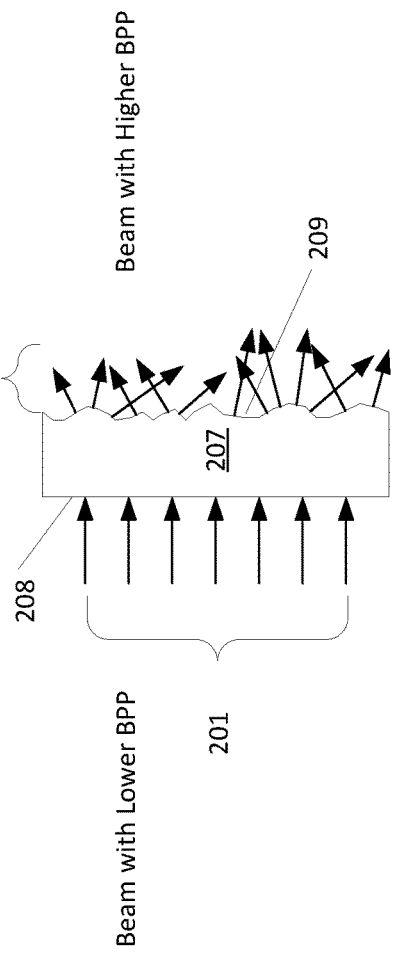

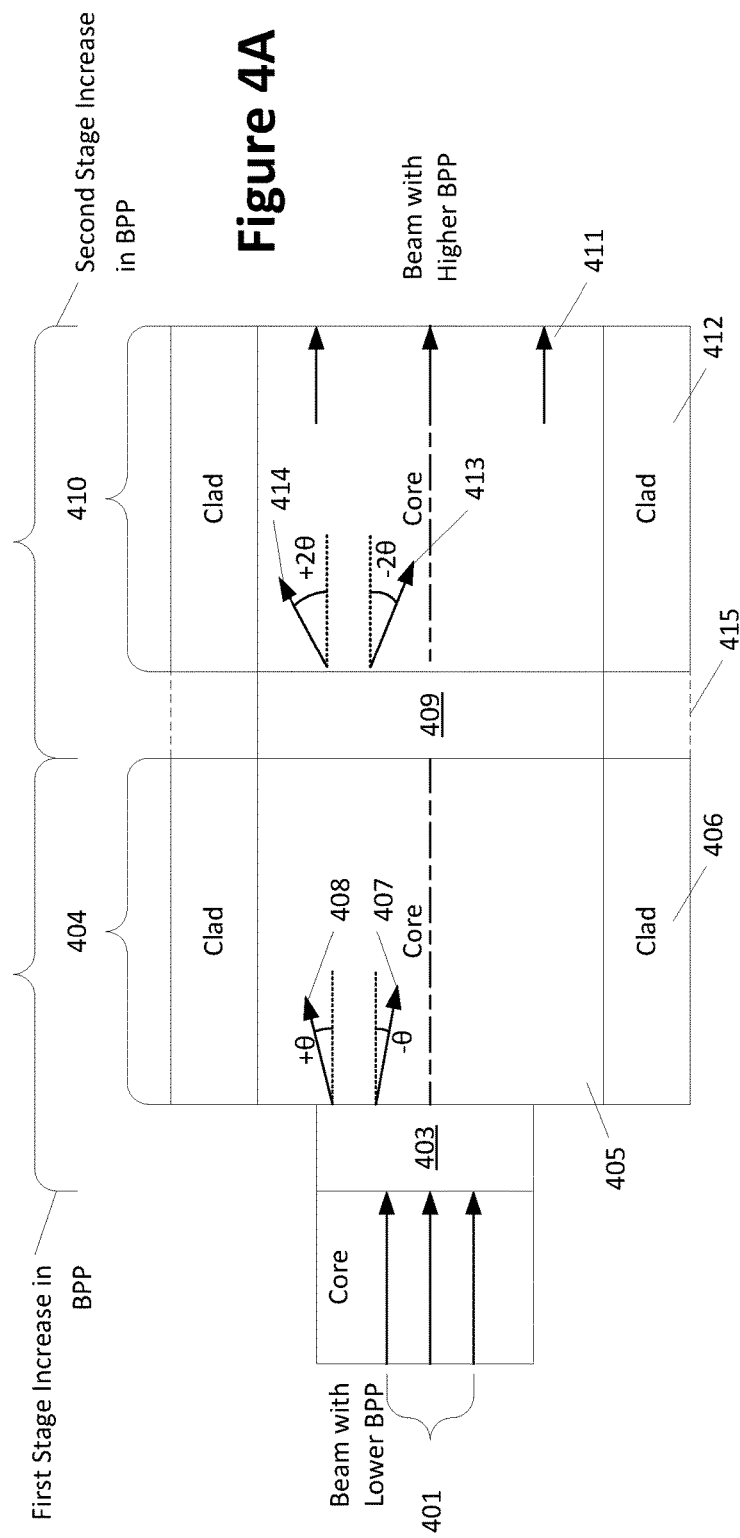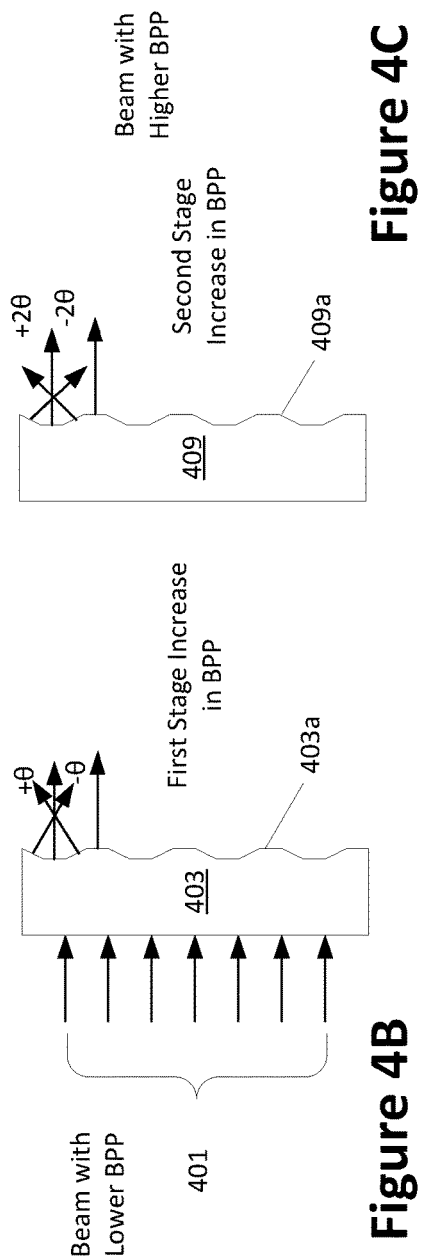

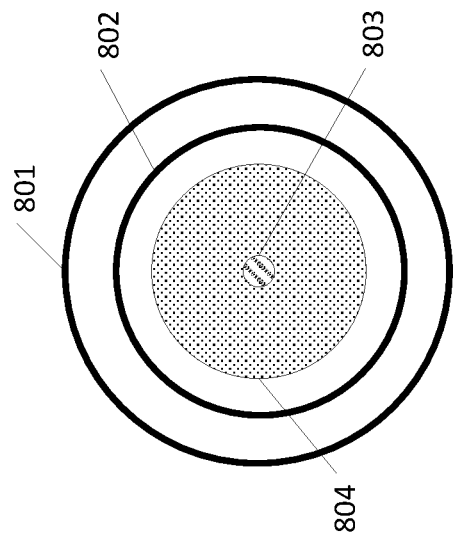
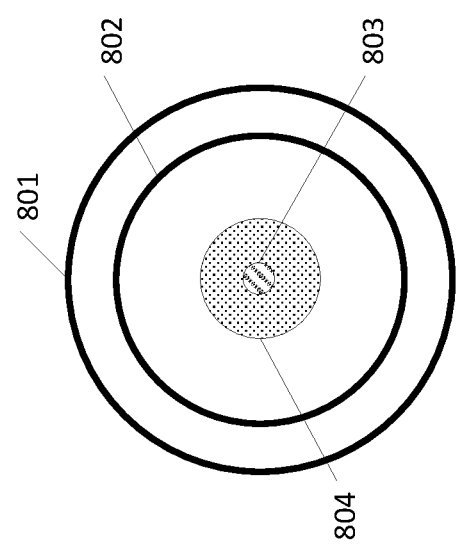
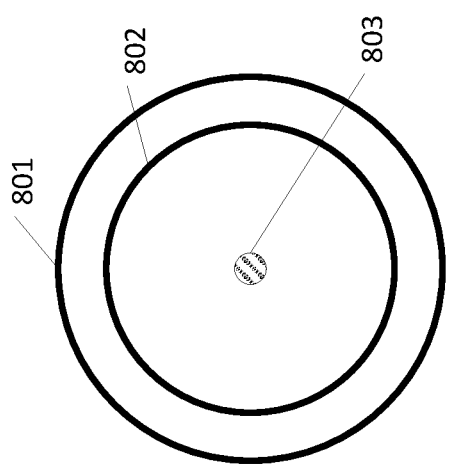
Figure 8C
Figure 8B
Figure 8A

LASER BEAM PRODUCT PARAMETER ADJUSTMENTS

TECHNICAL FIELD

Aspects of the disclosure relate to adjusting the beam product parameter of a laser to expand the number of applications in which the laser may be used.

BACKGROUND

High-powered lasers are prevalent in industrial manufacturing and machining operations. Types of lasers include gas-based (e.g., $CO_2$, neodymium (Nd) and neodymium yttrium-aluminum-garnet (Nd:YAG), laser microjet lasers, and fiber lasers. Industrial lasers may be used to cut, weld, or apply heat treatments (including cladding and hardening).

One controlling factor in determining the number of different uses of an industrial laser is the beam quality of an individual laser. Beam quality may be defined as the beam parameter product of a given laser. The beam parameter product is the product of a laser beam's divergence angle (half-angle) and the radius of the beam at its narrowest point (the beam waist). A beam with a low beam parameter product may be described as having a high beam quality. The beam parameter product is effectively constant when used with conventional focusing optics. For instance, while focusing and defocusing a given beam affects the spot size at a given image plane, the underlying beam parameter product does not change with the degree of focusing.

After investing in a laser system capable of delivering a high-power, high quality beam (a beam with a low beam parameter product), an issue remains on how to use that laser system for additional operations. Scaling down the input power may be one option. However, a beam parameter product is not necessarily modified by decreasing the power of the laser. Further, while a beam parameter product may suffer (may increase) due to possible thermal lensing in the laser gain medium while power is increased, beam parameter product may conversely improve (may decrease) as power is decreased. The effect is that decreasing a beam's power to a level appropriate for another operation (e.g., welding or even cladding, brazing, or hardening) may disqualify the use of the laser based on a decreasing beam parameter product.

SUMMARY

The following summary presents a simplified summary of certain features. The summary is not an exhaustive overview and is not intended to identify key or critical elements.

Systems, apparatuses, and methods are described for modifying a beam parameter product of a laser. The modified beam parameter product may increase the number of tasks that may be performed using a given laser with its original beam parameter product. By increasing the beam parameter product of a laser, a beam with an initially low beam parameter product beam may be modified to have a higher beam parameter product and used to perform tasks not associated with a beam having a low beam parameter product. One or more non-imaging refracting optics may be used to redirect portions of the beam at different angles. The redirected portions may increase the narrowest beam waist and may increase the beam parameter product. The non-imaging refracting optics may be used alone or in combination with additional non-imaging refracting optics to further increase the beam parameter product. The one or more non-imaging refracting optics may be used in combination with one or more optical couplers (e.g., one or more non-imaging refracting optics may be located at a coupling of two fiber optic cables) or with other optical components.

Additionally or alternatively, a Fiber Bragg grating may be used to redirect at least some portions of a beam to increase the narrowest waist of the beam, increasing the beam parameter product. The Fiber Bragg grating may include spaced optical components that may be canted at one or more angles relative to the centerline of the fiber. Additionally or alternatively, the Fiber Bragg grating may have varying spacing between the optical components.

The components for increasing a beam parameter product may be used in a standalone in a laser system. Additionally or alternatively, the components for increasing a beam parameter product may be used in combination with other components to permit selection between different beam qualities to perform different laser-based operations. Additionally or alternatively, the components may include combining beams of different beam parameter products to form a composite beam.

The preceding presents a simplified summary in order to provide a basic understanding of various parts of the disclosure. The summary is not an extensive overview of the disclosure. It is neither intended to identify key or critical elements of the disclosure nor to delineate the scope of the disclosure. The summary merely presents some concepts of the disclosure in a simplified form as a prelude to the description below.

BRIEF DESCRIPTION OF DRAWINGS

The present disclosure is described by way of example and not limited in the accompanying figures in which like reference numerals indicate similar elements and in which:

FIGS. 2A and 2B show an example of a beam parameter product modification using a non-imaging refracting optical component.

FIGS. 4A, 4B, and 4C show examples of beam parameter product modifications using multiple non-imaging refracting optical components.

FIGS. 8A, 8B, and 8C show various beam widths across a structure with a Fiber Bragg grating.

DETAILED DESCRIPTION

Figure 1:
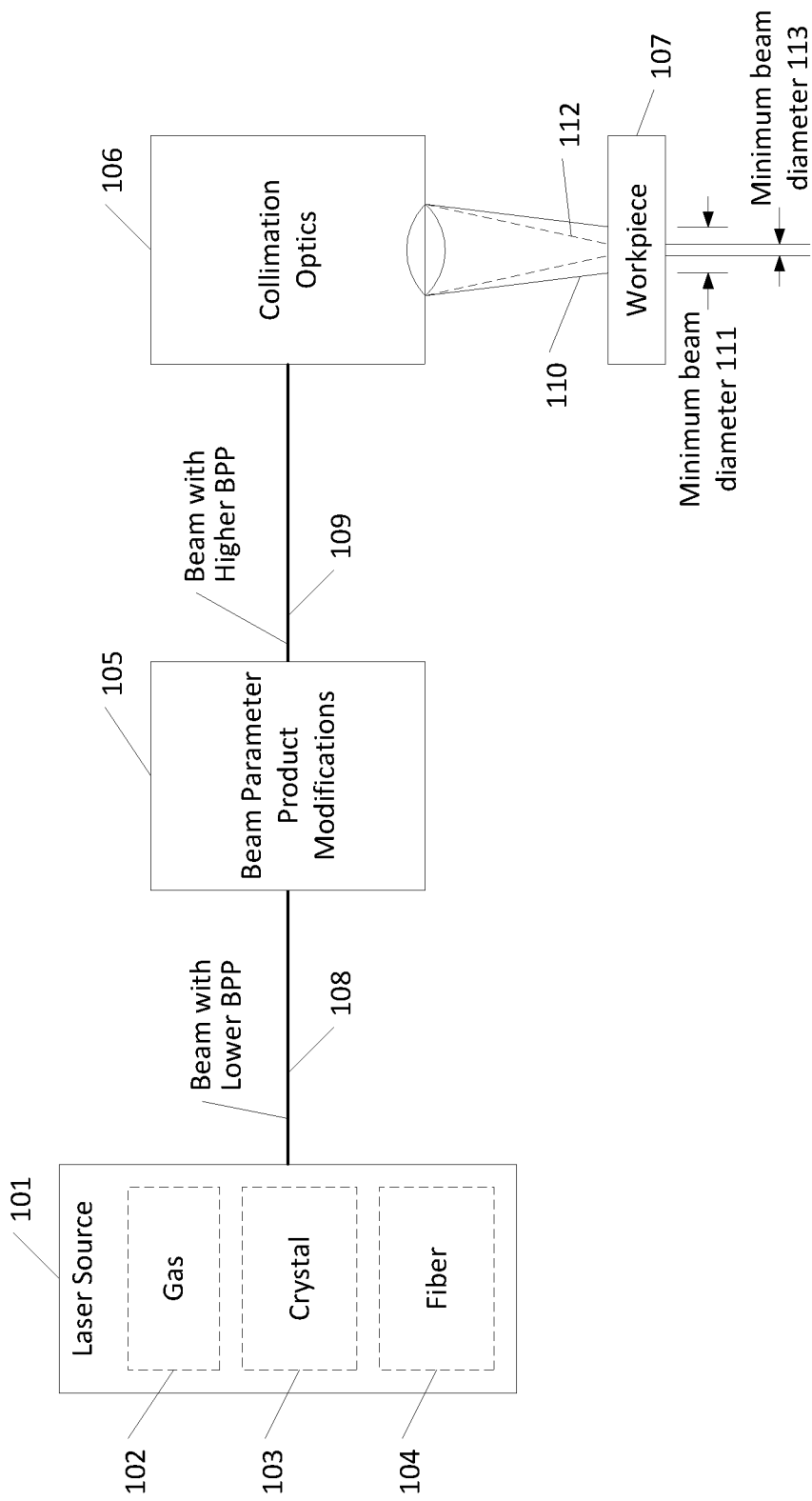
FIG. 1 shows an example of fiber-based beam parameter product modifications used in a laser system.

The accompanying drawings, which form a part hereof, show examples of the disclosure. It is to be understood that the examples shown in the drawings and/or discussed herein are non-exclusive and that there are other examples of how the disclosure may be practiced.

In addition, the phraseology and terminology used herein are for the purpose of description and should not be regarded as limiting. Rather, the phrases and terms used herein are to be given their broadest interpretation and meaning.

Industrial laser systems are used for a variety of tasks from cutting to welding to heat-related applications (including cladding and hardening). Some industrial laser systems use multimode fiber while other systems use single mode fiber. Different characteristics of laser beams make some beams appropriate for one task yet not for another. For instance, cutting tasks require a laser with a low beam parameter product, while cladding and hardening tasks require a laser with a high beam parameter product. High fluence beams may be used in industries beyond laser machining. For instance, in the electronic industry, low fluence tasks may include wire stripping and skiving of circuits. In the medical industry, low fluence tasks may include cosmetic surgery and hair removal while high fluence tasks may include micro cauterization and bone cutting.

Various systems and methods are described that increase the beam parameter product for at least a portion of a beam from a lower level to a higher level.

Lasers with low beam parameter products that were only appropriate for high fluence tasks (e.g., cutting, spot or seam welding, or drilling) may be used for low fluence tasks (e.g., cladding, marking, surface treatments, engraving, and the like). All of the resulting beam may be at a higher beam parameter product or only a portion of the resulting beam may be at a higher beam parameter product. Further, an original beam may be split into two or more portions where at least one of the two portions is modified by increasing its beam parameter product.

FIG. 1 shows an example of fiber-based beam parameter product modifications used in a laser system. The laser system may comprise a laser source 101, beam parameter product modification components 105, collimation optics 106, and a workpiece 107. The laser source 101 may generate a laser beam. The beam may be output via an optical fiber 108. The laser source 101 may be a gas laser 102 (e.g., a $CO_2$ laser), a crystal laser 103 (e.g., a Nd:YAG laser), and/or a fiber laser 104. The optical fiber 108 may be a single mode fiber or multi-mode fiber. For explanatory purposes, the optical fiber 108 is described with reference to a single-mode fiber. Further, the optical fibers described herein may comprise a single fiber or may be combinations of fiber with one or more segments in series and/or in parallel.

Beam quality modifications may be performed at a location between the laser source 101 and collimation optics 106. Beam quality may be defined as the beam parameter product BPP, which is equal to half the beam divergence (measured in the far field) multiplied by half the beam diameter (i.e., the radius). The units are mm mrad (millimeters times milliradians). The BPP is often used to specify the beam quality of a laser beam: the higher the beam parameter product, the lower is the beam quality. The BPP quantifies how well a beam can be focused to a small spot.

Beam parameter product modifications may include increasing the beam parameter product of a beam via one or more stages. Additionally or alternatively, the beam parameter product modifications may include increasing the beam parameter product of only a portion of the beam via one or more stages. The higher beam parameter product beam may be output via a fiber 109 to the collimation optics 106. The higher beam parameter product beam may be focused via the collimation optics 106 onto a workpiece 107. FIG. 1 shows a higher beam parameter product beam 110 in solid lines output from the collimation optics 106. A minimum beam diameter 111 for the higher beam parameter product beam 110 is shown by the distance across the higher beam parameter product beam 110 as striking the workpiece 107. For comparison purposes, a lower beam parameter product beam 112 (not modified by the beam parameter product modifications 105 or modified less than the higher parameter product beam 110) is shown in dashed lines. A minimum beam diameter 113 for the lower beam parameter product beam 112 is smaller than the minimum beam diameter 111 for the higher beam parameter product beam 110.

The minimum beam diameter 111 of the beam 110 is larger than the minimum beam diameter 113 of the beam 112. While beams 110 and 112 may have the same power, the fluence of the beam 110 may be lower than that of the beam 112. Accordingly, while the beam 112 may only have been useable in high fluence applications including cutting, the beam 110 may be more appropriate for applications requiring a lower fluence.

FIGS. 2A and 2B show an example of beam parameter product modifications using non-imaging refracting optics. FIG. 2A comprises a lower beam parameter product beam 201 in a core 202a surrounded by a cladding layer 202b. Together, the core 202a and the cladding layer 202b may comprise a single mode fiber 203. FIG. 2A may also comprise a multimode fiber 204 with a cladding layer 205 and a core 206. A non-imaging refracting optical component 207 may be located between the core 202a of the single mode fiber 203 and the core 206 of the multimode fiber 204. The non-imaging refracting optical component may be an optical element with a refracting surface that refracts portions of an incoming beam to different directions. The different directions may have the same or different angular refraction amounts (e.g., degrees θ). The different directions may have the same or different refracting directions relative to an angular rotation about the center axis of the fiber. In FIG. 2A, the non-imaging refracting optical component 207 is shown as part of single mode fiber 203. Additionally or alternatively, the non-imaging refracting optical component 207 may be located in the multimode fiber 204 or may be located between the single mode fiber 203 and the multimode fiber 204 (e.g., in a coupler or additional single mode/multimode fiber). Additionally or alternatively, the non-imaging refracting optical component 207 may be partially contained in the single mode fiber 203 and partially contained in the multimode fiber 204.

FIG. 2B comprises an enlarged view of the non-imaging refracting optical component 207. The non-imaging refracting optical component 207 comprises a planar surface 208 and a refracting surface 209. Beam 201, entering through the planar surface 208, is refracted while exiting refracting surface 209. Portions of light refracted by the refracting surface 209 are represented by beams 210. The non-imaging refracting optical component 207 is an example of non-imaging optics. Non-imaging optics alter the relationships between neighboring points. In contrast, imaging optics (across an entire light field) do not change neighboring points relative to one another. Accordingly, imaging optics are able to form an image on an image plane that replicates a source at an object plane. In other words, imaging optics (spanning an entire light field) by themselves are not generally known to change a beam parameter product.

One or more sections of the non-imaging refracting optical component 207 refract portions of higher beam parameter product beam 201 in one or more directions while other sections refract other portions of the higher beam parameter product beam 201 in other directions. The refracting surface 209 may include a prismatic surface that redirects portions of the higher beam parameter product beam in directions corresponding to each facet of the prismatic surface. Additionally or alternatively, the non-imaging refracting optical component 207 may include a fractured surface as the refracting surface 209. The refracting surface 209 may refract portions of an incoming light in random or pseudorandom directions and/or angles as based on at least a random or pseudorandom arrangement of facets. Additionally or alternatively, the facets may be a similar size and orientation or may have different sizes and/or orientations. Additionally or alternatively, the refracting surface 209 may be used to direct portions of higher beam parameter product beam 201 in different directions. Additionally or alternatively, the non-imaging refracting optical component 207 may be combined with imaging optics to provide some imaging operations while also providing mixing of beam portions.

Figure 3C:
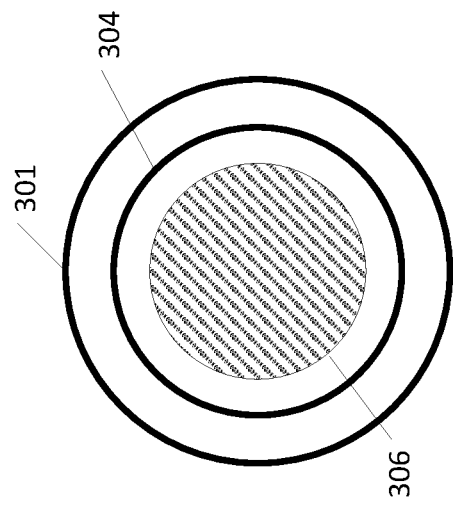
FIGS. 3A, 3B, and 3C show various beam widths across the structure of FIG. 2A.
Figure 3B:
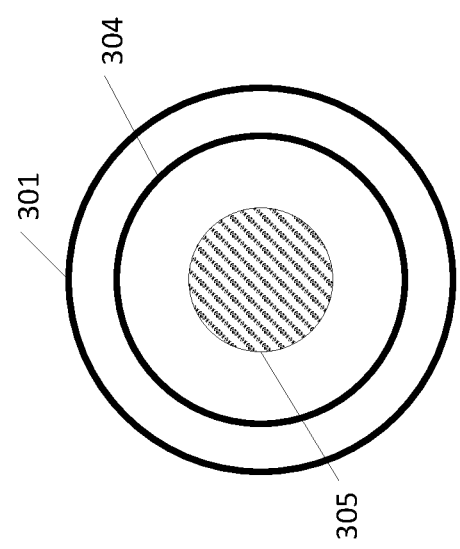
Figure 3A:
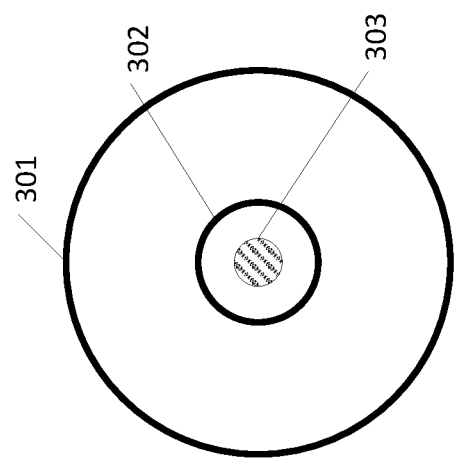

FIGS. 3A, 3B, and 3C show various beam widths across the structure of FIG. 2A. FIG. 3A shows a sectional view of FIG. 2A at dashed line I-I. FIG. 3A shows a cladding layer 301 surrounding a core 302 with the lower beam parameter product beam 201 of FIG. 2A having a small spot size 303. FIG. 3B shows a sectional view of FIG. 2A at dashed line II-II. FIG. 3B shows the cladding layer 301, a larger core 304 (e.g., a core of multimode fiber), and a higher beam parameter product beam having a larger spot size 305. FIG. 3C shows a sectional view of FIG. 2A at dashed line III-III. FIG. 3C shows the cladding layer 301, the larger core 304, and the higher beam parameter product beam having a spot size 306. As the sectional plane moves away from refracting surface 209, the beam width increases as the various beam portions, refracted by refracting surface 209, are permitted to travel farther until contacting the cladding 205/core 206 interface of multimode fiber 204.

FIGS. 4A, 4B, and 4C show examples of beam parameter product modifications using multiple non-imaging refracting optical components. In FIG. 4A, a lower beam parameter product beam 401 is passed from a single mode core 402 to a core 405 of a multimode fiber 404 and to another core 411 of another multimode fiber 410. A first non-imaging refracting optical component 403 may be located between the core 402 and the core 405, and a second non-imaging refracting optical component 409 may be located between the core 405 and the core 411. For simplicity, the cladding layer around core 402 is not shown.

Multimode fiber 404 comprises the multimode core 405 surrounded by cladding layer 406. Multimode fiber 410 comprises the multimode core 411 surrounded by cladding layer 412. Cladding layers 406 and 412 may be different cladding layers or may be a common cladding layer 415. Cladding layers 406 and 412 may have the same diameter or may have different diameters.

Non-imaging refracting optical component 403 may refract portions of beam 401 through a range of angles. In FIG. 4A, the range of angles is shown as −θ (407) through +θ (408). This range may be continuous or may be quantized into preset angular refractions (e.g., by ±0.01 θ to ±0.5 θ—other angular preset angular refractions larger and smaller than this range are useable as well). Non-imaging refracting optical component 409 may include the same degree of refraction (for example, through a range of angles −θ to +θ). In that beam portions from the first non-imaging refracting optical component 403 may be already refracted through the range −θ to +θ, non-imaging refracting optical component 409 may further refract those beam portions, resulting in refractions −2θ (413) through +2θ (414). Additionally or alternatively, non-imaging refracting optical component 409 may have a different range of refraction angles that may refract the beam portions from the non-imaging refracting optical component 403 through a different range (e.g., a range other than −θ to +θ) resulting in a different resulting range of angles (e.g., range other than −2θ through +2θ).

FIG. 4B shows an enlarged view of non-imaging refracting optical component 403. A refracting surface 403a provides a refracting range between −θ to +θ. FIG. 4C shows an enlarged view of non-imaging refracting optical component 409. A refracting surface 409a provides a refracting range between −2θ to +2θ. Combining non-imaging refracting optical components 403 and 409, the range of refracting angles for beam portions may, adding angular refractions, range from −3θ to +3θ.

Figure 5:
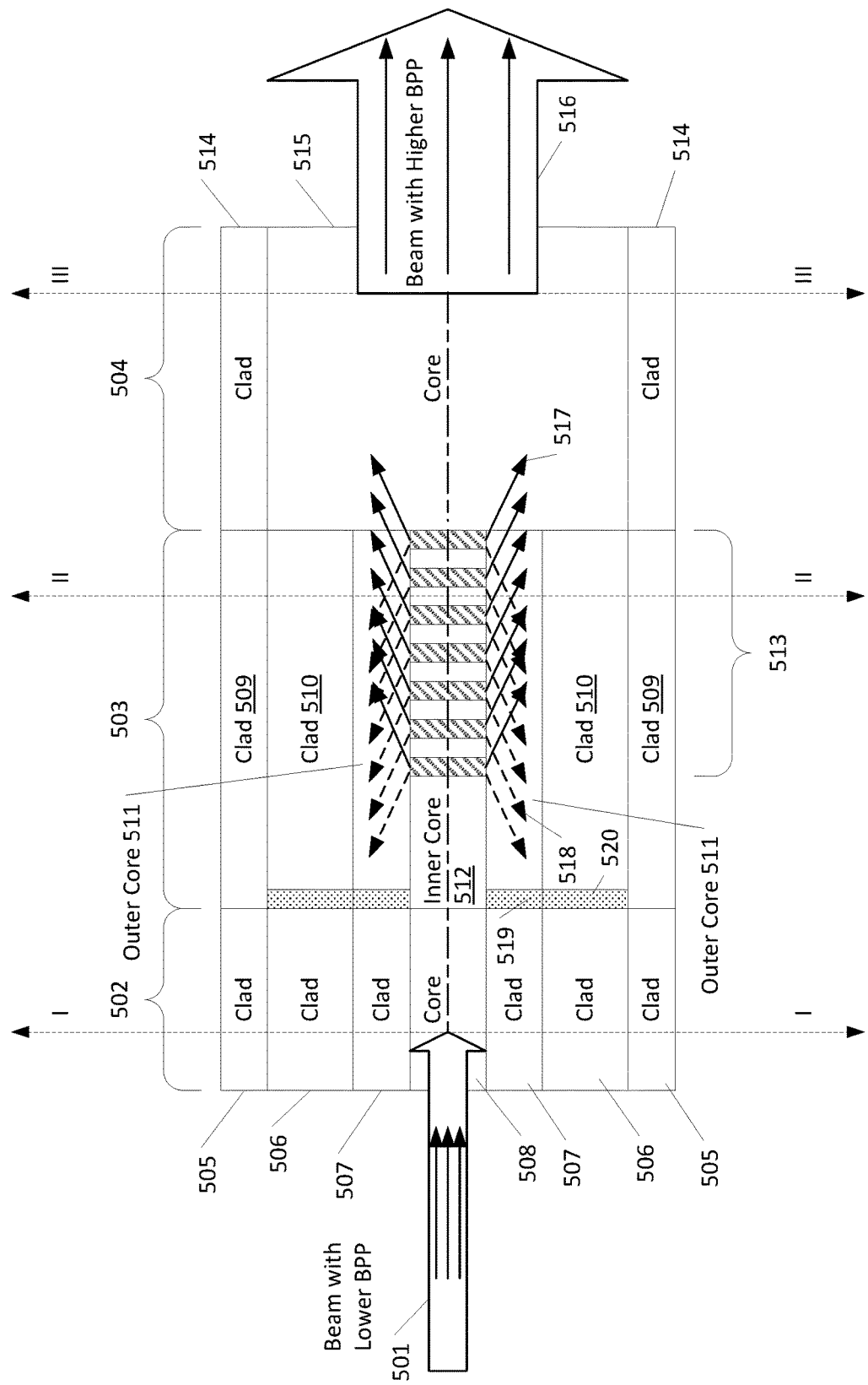
FIG. 5 shows an example of a beam parameter product modification using a Fiber Bragg grating.

FIG. 5 shows an example of beam parameter product modification using a Fiber Bragg grating. Higher beam parameter product beam 501 may be conveyed using a single mode fiber 502 with cladding layers 505-507 and core 508. Two or more of cladding layers 505-507 may be combined. The single mode fiber 502 may be attached to or an integrated portion of a fiber 503. The fiber 503 may include one or more cladding layers 509-510, an outer core 511, and an inner core 512. The inner core 512 may include a Fiber Bragg grating. The Fiber Brag grating may direct one or more portions of the beam 501 out of the inner core 512 into the outer core 511. The fiber 503 may be connected to a multimode fiber 504. The multimode fiber 504 may comprise a cladding layer 514 and a core 515 and conveys a resultant beam 516. The coupling between outer core 511 and multimode core 515 may permit a diameter of the resultant beam 516 to continue to expand. Directional arrows 517 and 518 are shown relative to the Fiber Bragg grating in fiber 503. The solid arrows 517 in fiber 503 may represent the effective deflection of portions of beam 501 into outer core 511. The beam portions represented by solid arrows may be a result of the Fiber Bragg grating being a long-period grating in which the beam portions of arrows 517 are in the same general direction of beam 501. Additionally or alternatively, the Fiber Bragg grating in fiber 503 may reflect beam portions represented by dashed arrows 518. To redirect the beam portions represented by dashed arrows 518 to the same direction of beam 501, fiber 503 may include reflective layer 519. Additionally or alternatively, depending on the refractive index of cladding layer 510 (e.g., permitting at least some wavelengths to use it as a core layer), an additional reflective layer 520 may be included for cladding layer 510. Reflective layer 519 (and reflective layer 520 where used) may be a reflective surface or two or more reflective surfaces. The reflective surface or surfaces may be planar, curved, or be faceted similar to that of refracting surface 209. Beam portions represented by dashed arrows 518 may be reflected by the reflective surface or surfaces to redirect the beam portions in the direction of fiber 504.

Figure 6C:
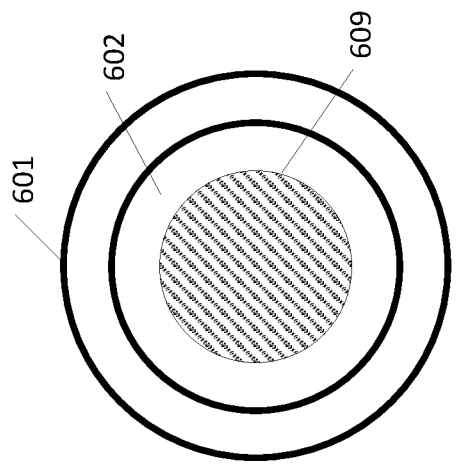
FIGS. 6A, 6B, and 6C show various beam widths across the structure of FIG. 5.
Figure 6B:
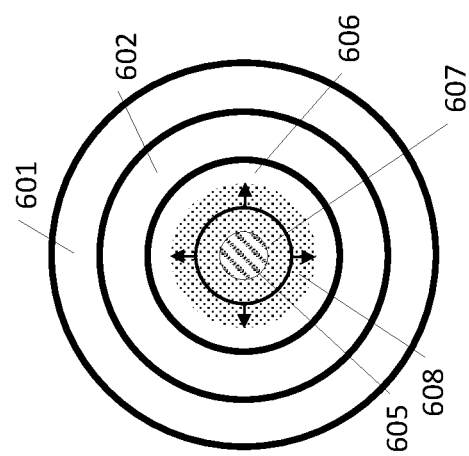
Figure 6A:
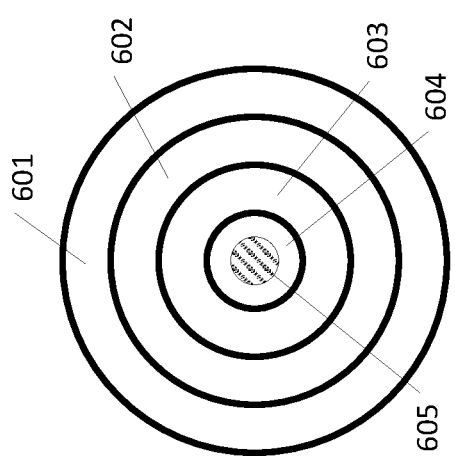

FIGS. 6A, 6B, and 6C show various beam widths across the structure of FIG. 5. FIG. 6A shows a sectional view of FIG. 5 at dashed line I-I. FIG. 6A shows cladding layers 601-603 and a single mode core 604. A lower beam parameter product beam 605 is shown with a narrow diameter. FIG. 6B shows a sectional view of FIG. 5 at dashed line II-II. FIG. 6B shows cladding layers 601-602, outer core 606, and inner core 607. A portion of the lower beam parameter product beam is shown as 605 with the same diameter as the beam 605 in FIG. 6A. A beam 608 is shown as an expanding diameter region in the outer core 606. The beam 608 is due to portions of the lower beam parameter product beam interacting with the elements of the Fiber Bragg grating of FIG. 5. FIG. 6C shows a sectional view of FIG. 5 at dashed line III-III. FIG. 6C shows a cladding layer 601 and a multimode core 602. A higher beam parameter product beam 609 with a large beam diameter is shown. The higher beam parameter product beam 609 may be a combination of a residual portion of the lower beam parameter product beam 605 and beam 608 (that was refracted out of beam 605 based on interactions with the Fiber Bragg grating of FIG. 5).

Figure 7B:
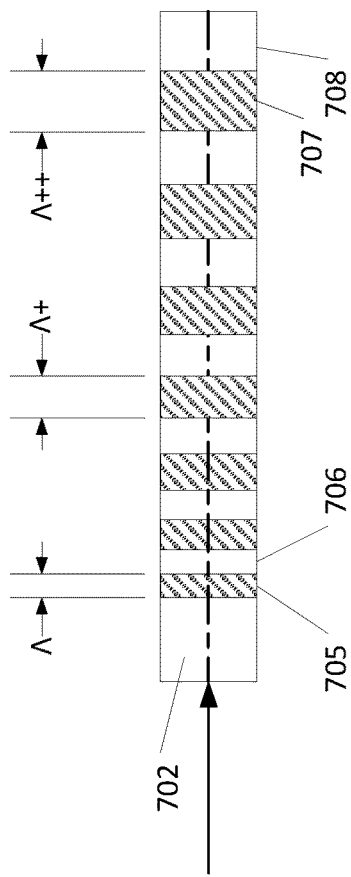
FIGS. 7A, 7B, 7C, and 7D show examples of the Fiber Bragg grating of FIG. 5.
Figure 7D:
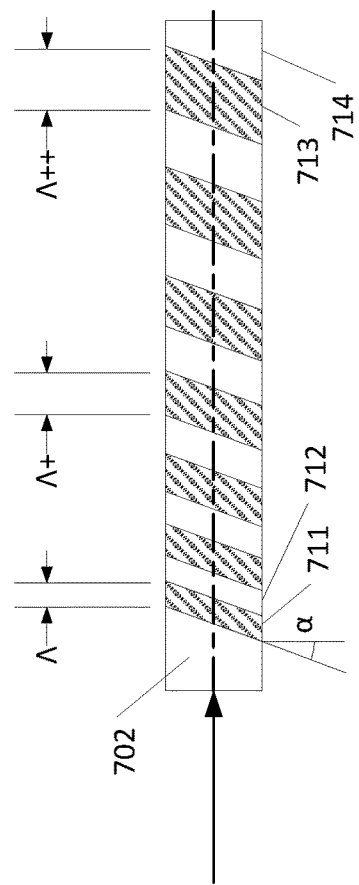
Figure 7A:
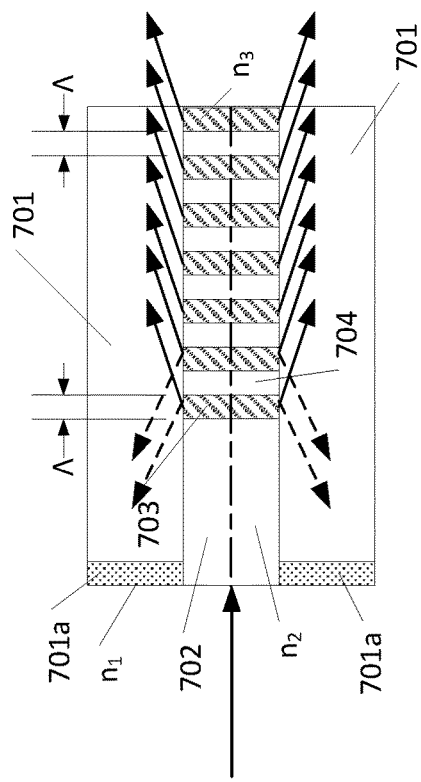
Figure 7C:
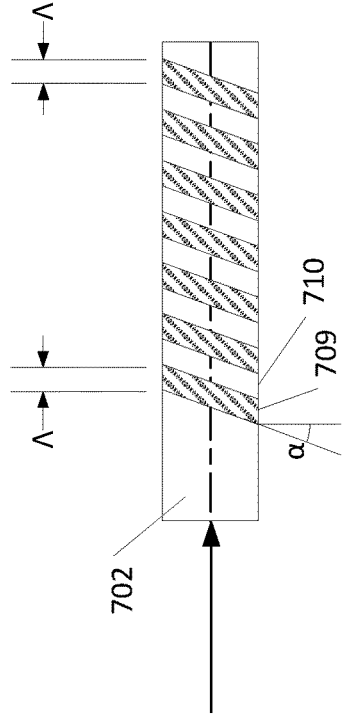

FIGS. 7A, 7B, 7C, and 7D show examples of the Fiber Bragg grating of FIG. 5. FIG. 7A shows a Fiber Bragg grating with an outer core 701 and an inner core 702. FIGS. 7B-7D show inner core 702 while outer core 701 is not shown. In FIG. 7A, the Fiber Bragg grating includes elements 703 and 704 that are equally spaced by a distance Λ. For reference, the index of refraction for outer core 701 is $n_1$, the index of refraction for inner core 702 and Fiber Bragg grating portions 704 is $n_2$, and the index of refraction for Fiber Bragg grating portions 703 is $n_3$. Both solid and dashed arrows are shown in FIG. 7A to represent beam portions reflected (e.g., through a shorter period Fiber Bragg grating) or refracted (e.g., through a long-period grating). Depending on the direction of beam portions modified by the portions 703 and 704, one or more reflective layer or layers 701a may be included to redirect beam portions toward the right side of FIG. 7A (e.g., in the general direction of an incident beam in core 702). In FIG. 7B, the Fiber Bragg grating is chirped. Over the length of the Fiber Bragg grating, the elements 705, 706, 707, and 708 have longer lengths (along the length of the fiber). For instance, the length of Fiber Bragg grating element 705 (located near the beginning of the Fiber Bragg grating) is Λ while Fiber Bragg grating element 707 (near the end of the Fiber Bragg grating) is Λ++ (indicating a length greater than Λ+ and much greater than Λ). In FIG. 7C, the elements 709 and 710 of the Fiber Bragg grating are canted relative to the direction of the length of the Fiber Bragg grating. The length of each element 709 and 710 are generally the same (e.g., Λ) while each element 709 and 710 are canted at angle α. The cant angle α of an individual element 709 or 710 may be the same angle α for all elements or may vary to different angles. FIG. 7D combines both the chirping of FIG. 7B and the canting of FIG. 7C, resulting in Fiber Bragg grating elements 711, 712, 713, and 714 increasing in length over the length of the Fiber Bragg grating and being canted relative to the length of the Fiber Bragg grating. The cant angle α may be uniform for all elements or may vary.

FIGS. 8A, 8B, and 8C show various beam widths across another example of fibers. Instead of a single mode fiber carrying a lower beam parameter product beam, FIG. 8A shows a multimode fiber with cladding 801 and multimode core 802 carrying the lower beam parameter product beam. FIG. 8B shows the cladding 801 and multimode core 802 with a portion of the lower beam parameter product beam 803 and a higher beam parameter product beam 804. FIG. 8C shows a sectional view downstream from that of FIG. 8B. In FIG. 8C, the beam width of the higher beam parameter product beam 804 has continued to expand.

Figure 9:
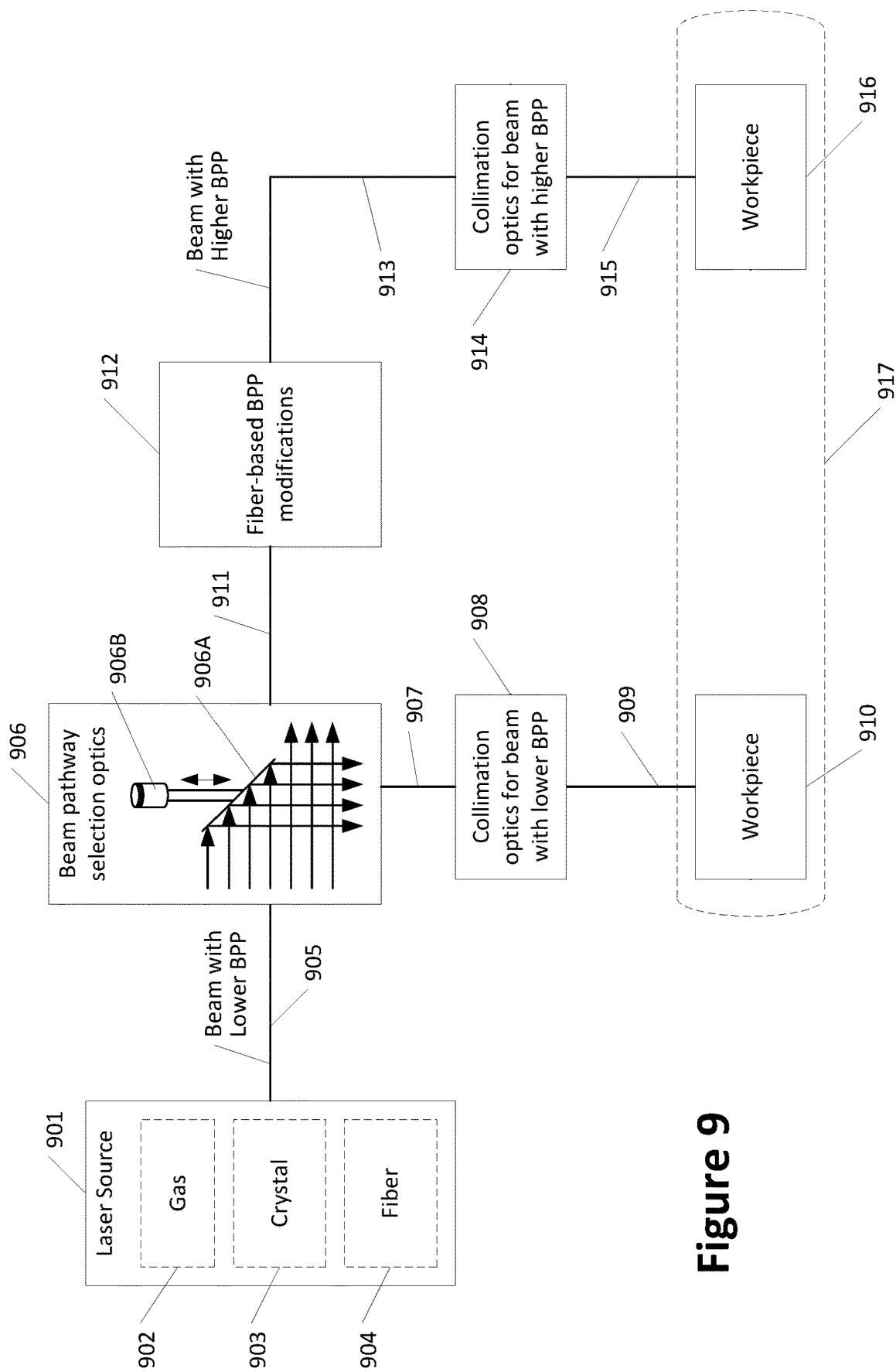
FIG. 9 shows an example of laser system with selectable beam parameter product being directed to different collimation optics.

FIG. 9 shows an example of laser system with selectable beam parameter product being directed to different collimation optics. In FIG. 9, a laser source 901 may generate a lower beam parameter product beam using one or more lasers including, but not limited to, a gas laser 902, a crystal laser 903, or a fiber laser 904. The lower beam parameter product beam may be conveyed via a single or multimode fiber 905 to beam pathway selection optics 906. Beam pathway selection optics 906 (e.g., a switching coupler) may include one or more optical devices including, for instance, an optical coupler, a prism, a mirror, or a lens or combinations of two or more of these devices. As an example, beam pathway selection optics are shown with a mirror 906A that may be moved, via actuator 906B, into and out of the path of a beam from fiber 905. The mirror 906A may have only two positions (e.g., directing all of the incoming beam to one of two outputs of beam pathway selection optics 906). Additionally or alternatively, the mirror 906A may have three or more positions to direct less than all of the incoming beam to one output and the remainder to another output. For example, for directing between 0% and 100% of an incoming beam to an output at 10% increments, the mirror 906A may have 11 positions.

Mirror 906A may be a single, solid reflecting mirror. Additionally or alternatively, the mirror 906A may be a collection of partially reflective mirrors with different degrees of reflectance. By selecting one of the mirrors of the collection of mirrors 906A, the incoming beam from fiber 905 may be directed based on the degree of silvering of the selected mirror. The use of partially reflective mirrors to direct a portion of the incoming beam may reduce possible alignment issues between the incoming beam and a leading edge of solid mirror 906A. Other mirrors, prisms, or other optical components may be used with or in place of the mirror 906A and actuator 906B as shown in FIG. 9. A first output from beam pathway selection optics 906 may convey the beam or portion of the beam to fiber 907. A second output from beam pathway selection optics 906 may convey the beam or portion of the beam to fiber 911.

Fiber 907 may be connected to collimation optics 908 for a lower beam parameter product beam. The collimation optics 908 may include one or more optical devices including, for instance, an optical coupler, a prism, a mirror, or a lens or combinations of two or more of these devices. The output beam may be directed via fiber optic cable 909 to workpiece 910. If a higher beam parameter product beam was selected (or portion of the beam selected) at the beam pathway selection optics 906, the beam parameter product of the lower beam parameter product beam in fiber 911 may be increased by fiber-based beam parameter product modifications 912 (which may include beam parameter product modifications using one or more non-imaging refracting optical components or one or more Fiber Bragg gratings). The resulting higher beam parameter product beam may be conveyed via fiber 913 to collimation optics 914. The collimation optics 914 may include one or more optical devices including, for instance, an optical coupler, a prism, a mirror, or a lens or combinations of two or more of these devices. The resulting, collimated higher beam parameter product beam may be directed via fiber optic cable 915 to workpiece 916. Workpieces 910 and 916 may be different work pieces or may be the same workpiece that has been conveyed between locations via track/platen/conveying system 917.

Figure 10:
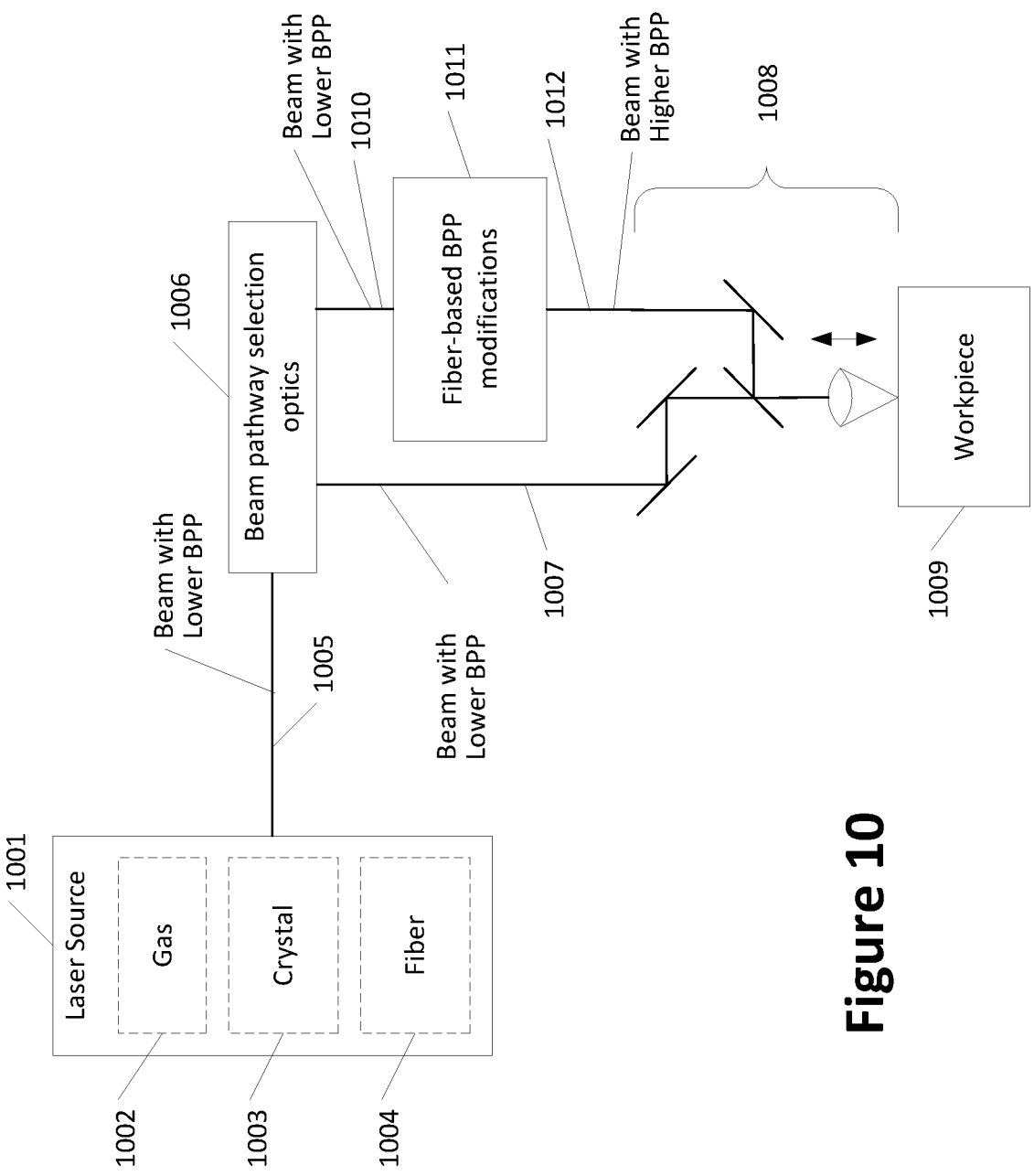
FIG. 10 shows an example of laser system with selectable a beam parameter product being directed to common collimation optics.

FIG. 10 shows an example of laser system with selectable beam parameter product being directed to collimation optics. In FIG. 10, a laser source 1001 may generate a lower beam parameter product beam using one or more lasers including, but not limited to, a gas laser 1002, a crystal laser 1003, or a fiber laser 1004. The lower beam parameter product beam may be conveyed via a single or multimode fiber 1005 to beam pathway selection optics 1006 (e.g., a switching coupler as describe in FIG. 9 or other arrangement). Beam pathway selection optics 1006 may include one or more optical devices including, for instance, an optical coupler, a prism, a mirror, or a lens or combinations of two or more of these devices. A lower beam parameter product beam may be conveyed to collimation optics 1008 for use on a workpiece 1009. Upon selection of a higher beam parameter product beam at beam pathway selection optics 1006, a lower beam parameter product beam 1010 may be increased in beam parameter product by fiber-based beam parameter product modifications 1011 (which may include beam parameter product modifications using one or more non-imaging refracting optical components or one or more Fiber Bragg gratings). The higher beam parameter product beam may be output to common collimation optics 1008 for use on the workpiece 1009.

In one example, the selection of a lower beam parameter product laser or a higher beam parameter product laser via beam pathway selection optics 1006 may result in only a lower beam parameter product beam being directed to the workpiece 1009 or only a higher beam parameter product beam being directed to the workpiece 1009. In another example, the beam pathway selection optics 1006 may permit selection of a portion of the lower beam parameter product beam to be directed to the collimation optics 1008 while the remaining portion is directed to the fiber-based beam parameter product modifications 1011, resulting in beam 1012 with a higher beam parameter product. The selection of the ratio of a lower beam parameter product beam to a higher beam parameter product beam may be performed by, for instance, using a partially-reflective mirror or prism or combination or other components to direct a portion of the laser to one output while directing the remaining portion to another output, as described with respect to FIG. 9. Further, multiple combinations may be selectable including, for example, three beam portions with each having a different beam parameter product. The three beam portions may be split by, for instance, using a partially-reflective mirror or prism or combination or other components to direct a portion of the laser to one output while directing the remaining portions to be split again, with each portion being directed to its own output. Further, the splitting of beams may be uniform or may be selectable, resulting in different ratios or portions for each of the three or more beams.

Collimation optics 1008 may combine beams 1007 and 1012 into a collinear beam.

Additionally or alternatively, the collimation optics 1008 may direct beams 1007 and 1012 to an area of workpiece 1009 that result in the beams irradiating a common area on workpiece 1009. Further, the motion of workpiece 1009 may be considered when determining the locations of beams 1007 and 1012. For instance, the lower BPP beam 1007 may precede the higher BPP beam 1012 in irradiating a given area of workpiece 1009 as moved relative to collimation optics 1008. Additionally or alternatively, the higher BPP beam 1012 may precede the lower BPP beam 1007. Further, one or more of beams 1007 and 1012 may be further split and interleaved with one or more the other beam (or portions of the other beam).

By directing two or more beams at a single workpiece, each beam having a different beam parameter product, a temperature gradient between a beam with a low beam parameter product and a beam 1007 with a high beam parameter product may be better regulated. For example, if the beam with the low beam parameter product is used for a welding operation, the edges of the beam may create a sharp temperature gradient. To reduce a need for additional processing of the welded area, a beam with a higher BPP may irradiate the area around or behind the spot irradiated by the beam with the lower BPP.

The various fiber optic cables may be single mode, multimode, and/or combinations thereof. Coupling devices may be fiber optic couplers and/or integrated devices using other optical components including, but not limited to, imaging optics, mirrors, prisms, and the like.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A system comprising:
   a first fiber optic cable having a core, the core configured to receive a first laser beam of a first beam parameter product, the first beam parameter product being a product of a divergence angle of the first laser beam and a radius of a narrowest beam waist of the first laser beam;
   a non-imaging refracting optical component configured to receive the first laser beam from the core of the first fiber optic cable at an input surface and to output a second laser beam of a second beam parameter product from an output surface opposite the input surface, the second beam parameter product being a product of a divergence angle of the second laser beam and a radius of a narrowest beam waist of the second laser beam; and
   a second fiber optic cable having a core configured to receive the second laser beam,
   wherein:
   the narrowest beam waist of the first laser beam is less than the narrowest beam waist of the second laser beam;
   the first beam parameter product is less than the second beam parameter product; and
   the output surface of the non-imaging refracting optical component is a prismatic surface configured to redirect portions of the first laser beam in directions corresponding to each facet of the prismatic surface.

2. The system according to claim 1, wherein the first fiber optic cable is a single mode cable.

3. The system according to claim 1, wherein the second fiber optic cable is a multimode cable.

4. The system according to claim 1, further comprising:
   a beam collimator configured to receive at least one of the first laser beam and the second laser beam, the beam collimator configured to collimate the at least one received beams onto a workpiece.

5. The system according to claim 1, wherein the non-imaging refracting optical component is a first refracting optical component, and wherein the system further comprises:
   a second non-imaging refracting optical component configured to receive the second laser beam from the second fiber optic cable, the second non-imaging refracting optical component configured to output a third laser beam with a third beam parameter product; and
   a third fiber optic cable configured to receive the third laser beam, wherein a narrowest beam waist of the third laser beam is greater than the narrowest beam waist of the second laser beam and the third beam parameter product is greater than the second beam parameter product.

6. The system of claim 1, wherein the prismatic surface is configured to refract portions of the first laser beam incident thereon in random directions based on a random arrangement of facets of the prismatic surface.

7. The system of claim 1, wherein the prismatic surface is configured to refract portions of the first laser beam incident thereon in pseudorandom directions based on a pseudorandom arrangement of facets of the prismatic surface.

8. The system of claim 1, wherein facets of the prismatic surface have same sizes and orientations.

9. The system of claim 1, wherein facets of the prismatic surface have different sizes and orientations.

10. A system comprising:
a first fiber optic cable having a core, the core configured to receive a first laser beam having a first beam parameter product;
a Fiber Bragg grating configured to receive the first laser beam from the core of the first fiber optic cable, the Fiber Bragg grating configured to output a second laser beam having a second beam parameter product; and
a second fiber optic cable having a core configured to receive the second laser beam,
wherein a narrowest beam waist of the first laser beam is less than a narrowest beam waist of the second laser beam and the first beam parameter product is less than the second beam parameter product.

11. The system according to claim 10, wherein the first fiber optic cable is a single mode cable.

12. The system according to claim 10, wherein the second fiber optic cable is a multimode cable.

13. The system according to claim 10, further comprising:
a beam collimator configured to receive at least one of the first laser beam and the second laser beam, the beam collimator configured to collimate the at least one of the received beams onto a workpiece.

14. The system according to claim 10, wherein the Fiber Bragg grating comprises a chirped Fiber Bragg grating.

15. The system according to claim 10, wherein the Fiber Bragg grating comprises elements canted one or more angles relative to a length direction of the Fiber Bragg grating.

16. The system according to claim 10, wherein the Fiber Bragg grating comprises a chirped Fiber Bragg grating, and wherein the Fiber Bragg grating comprises elements canted one or more angles relative to a length direction of the Fiber Bragg grating.

17. A method implemented in a system that includes:
a first fiber optic cable having a core, the core configured to receive a first laser beam having a first beam parameter product;
a Fiber Bragg grating configured to receive the first laser beam from the core of the first fiber optic cable, the Fiber Bragg grating configured to output a second laser beam having a second beam parameter product; and
a second fiber optic cable having a core configured to receive the second laser beam, wherein a narrowest beam waist of the first laser beam is less than a narrowest beam waist of the second laser beam and the first beam parameter product is less than the second beam parameter product,
the method comprising:
receiving, via the first fiber optic cable, the first laser beam;
modifying the first laser beam to the second laser beam in the Fiber Bragg grating; and
outputting, via the second fiber optic cable, the second laser beam.

18. The method according to claim 17, further comprising:
receiving a selection of whether to modify the first laser beam; and
outputting, based on the selection, the first laser beam to be modified.

19. The method according to claim 17, further comprising:
receiving a selection; and
directing a portion of a received laser beam to the first fiber optic cable.

20. The method according to claim 17, further comprising:
receiving the second laser beam;
receiving a laser beam with a low beam parameter product;
collimating the second laser beam and the laser beam with the low beam parameter product; and
outputting a combined laser beam to a workpiece.

* * * * *